US011758285B2

(12) United States Patent
Luo et al.

(10) Patent No.: US 11,758,285 B2
(45) Date of Patent: Sep. 12, 2023

(54) PICTURE SELECTION METHOD AND RELATED DEVICE

(71) Applicant: HUAWEI TECHNOLOGIES CO., LTD., Guangdong (CN)

(72) Inventors: Daxin Luo, Beijing (CN); Fenglong Song, Beijing (CN); Songcen Xu, Shenzhen (CN); Yi Liu, Shenzhen (CN); Youliang Yan, Shenzhen (CN); Jianzhuang Liu, Shenzhen (CN); Li Qian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 192 days.

(21) Appl. No.: 17/330,133

(22) Filed: May 25, 2021

(65) Prior Publication Data
US 2021/0281754 A1 Sep. 9, 2021

Related U.S. Application Data

(63) Continuation of application No. PCT/CN2019/122268, filed on Nov. 30, 2019.

(30) Foreign Application Priority Data

Nov. 30, 2018 (CN) .......................... 201811462769.X

(51) Int. Cl.
*G06T 7/246* (2017.01)
*H04N 23/80* (2023.01)
(Continued)

(52) U.S. Cl.
CPC ........... *H04N 23/80* (2023.01); *G06T 7/0002* (2013.01); *G06T 7/246* (2017.01); *H04N 23/63* (2023.01);
(Continued)

(58) Field of Classification Search
CPC ........ H04N 23/80; H04N 23/63; H04N 23/64; G06T 7/0002; G06T 7/246;
(Continued)

(56) References Cited

U.S. PATENT DOCUMENTS

| 8,786,835 B1* | 7/2014 | Reardon ............... G09B 9/006 356/9 |
| 2010/0150401 A1* | 6/2010 | Kizuki .................... G06T 7/277 382/103 |

(Continued)

FOREIGN PATENT DOCUMENTS

| CN | 101184226 A | 5/2008 |
| CN | 101425088 A | 5/2009 |

(Continued)

OTHER PUBLICATIONS

Wei Xiong et al., Automatic video data structuring through shot partitioning and key-frame computing. Machine Vision and Applications, 10, pp. 51 65(1997), Jun. 1997, 15 pages.

(Continued)

*Primary Examiner* — Stephen P Coleman
(74) *Attorney, Agent, or Firm* — HUAWEI TECHNOLOGIES CO., LTD.

(57) ABSTRACT

In a method for selecting pictures from a sequence of pictures of an object in motion, a computerized user device determines, for each picture in the sequence of pictures, a value of a motion feature of the object. Based on analyzing the values of the motion feature of the pictures in the sequence, the device identifies a first subset of pictures from the pictures in the sequence. The device then selects, based on a second selection criterion, a second subset of pictures from the first subset of pictures. The pictures in the second subset are displayed to a user for further selection.

15 Claims, 8 Drawing Sheets

(51) Int. Cl.
 G06T 7/00 (2017.01)
 H04N 23/63 (2023.01)
(52) U.S. Cl.
 CPC ............... *G06T 2207/10016* (2013.01); *G06T 2207/30168* (2013.01)
(58) Field of Classification Search
 CPC . G06T 2207/10016; G06T 2207/30168; G06T 2207/20084; G06T 7/254; G06F 16/51; G06F 16/53
 USPC ....................................................... 348/222.1
 See application file for complete search history.

(56) References Cited

U.S. PATENT DOCUMENTS

| | | | | |
|---|---|---|---|---|
| 2010/0292618 | A1* | 11/2010 | Okuya | A61B 5/1038 600/595 |
| 2013/0251274 | A1 | 9/2013 | Xie et al. | |
| 2014/0118506 | A1* | 5/2014 | Uhl | H04N 13/261 348/46 |
| 2016/0051215 | A1* | 2/2016 | Chen | G06T 11/001 715/771 |
| 2016/0210759 | A1 | 7/2016 | Baek et al. | |

FOREIGN PATENT DOCUMENTS

| | | |
|---|---|---|
| CN | 103065153 A | 4/2013 |
| CN | 104185981 A | 12/2014 |
| CN | 104794189 A | 7/2015 |
| CN | 105229700 A | 1/2016 |
| CN | 105450911 A | 3/2016 |
| CN | 105531988 A | 4/2016 |
| CN | 105654463 A | 6/2016 |
| CN | 105894031 A | 8/2016 |
| CN | 106162322 A | 11/2016 |
| CN | 108876782 A | 11/2018 |
| CN | 109902189 A | 6/2019 |

OTHER PUBLICATIONS

AI Technology Review, "In academia Google Research releases NIMA: It can evaluate how beautiful an image is, and it can make it more beautiful", Dec. 12-19, 2017, http://www.voidcn.com/article/p-bgrcsayh-brn.html, 11 pages.

* cited by examiner

PICTURE SELECTION METHOD AND RELATED DEVICE

CROSS REFERENCE TO RELATED APPLICATIONS

This application is a continuation of International Application No. PCT/CN2019/122268, filed on Nov. 30, 2019, which claims priority to Chinese Patent Application No. 201811462769.X, filed on Nov. 30, 2018. The aforementioned priority applications are hereby incorporated by reference in their entirety.

TECHNICAL FIELD

This application relates to the field of electronic technologies, and in particular, to a picture selection method and a related device.

BACKGROUND

When using a terminal device such as a digital camera or a mobile phone to shoot a motion scene, a user desires to quickly and accurately capture a wonderful moment of a target object in the motion scene. Generally, the user can shoot a plurality of pictures by using a burst shoot function of the terminal device, and stores all these pictures. Then, the user picks out, according to a personal preference, a picture that the user considers better, and then manually deletes a picture that needs to be discarded. The user may alternatively obtain a motion segment by using a shot video or a video downloaded from a network, and then deframe the video to select a required picture. However, accuracy of this picture selection manner is low.

SUMMARY

Embodiments of this application provide a picture selection method and a related device, to increase picture selection accuracy and a differentiation degree of selected pictures.

According to a first aspect, an embodiment of this application provides a picture selection method, including: first obtaining feature information of each of M pictures in a time sequence, where the feature information is used to describe display content of a corresponding picture, and M is a positive integer; second determining inter-frame information of the M pictures in the time sequence based on the feature information of each of the M pictures, where the inter-frame information indicates a relationship and/or a change status of the feature information in the time sequence; and then determining a feature change key point based on the inter-frame information, and when the relationship meets a first preset threshold and/or the change status meets a second preset threshold, and using a time point that is of a current frame and that corresponds to the relationship and/or the change status as the feature change key point, where the time point is a point in the time sequence; finally selecting, from the M pictures, N pictures corresponding to feature change key points, where N is a positive integer less than or equal to M; and playing or displaying the N pictures. Because the feature change key point corresponds to a moment of a speed or a rhythm change in a motion process, a picture is selected by using the feature change key point, so that a picture that better meets a user requirement can be captured, thereby increasing picture selection accuracy. In addition, the feature change key point is selected, so that an action of a target person in the picture is divided into a plurality of phases, and pictures in different phases can be further selected, thereby ensuring a differentiation degree of the selected pictures.

In a possible design, the N pictures that directly one-to-one correspond to N feature change key points may be selected from the M pictures. The feature change key point is selected, so that an action of a target object in the picture is divided into a plurality of phases, and pictures in different phases can be further selected, thereby ensuring a differentiation degree of the selected pictures.

In another possible design, a picture directly corresponding to a first feature change key point and pictures corresponding to time points within a preset range before and after the first feature change key point may be obtained, to constitute a key picture set of the first feature change key point, a quality metric value of each picture in the key picture set is determined, and a picture corresponding to a maximum quality metric value is selected as the picture that one-to-one corresponds to the first feature change key point, where the first feature change key point is any feature change key point of the N feature change key points. The feature change key point is selected, so that an action of a target person in the picture is divided into a plurality of phases, and then a picture with a maximum quality metric value is selected from a plurality of pictures in each phase, thereby not only ensuring a differentiation degree of pictures, but also improving quality of the selected pictures.

In another possible design, feature information of a first picture of the M pictures and feature information of a second picture of the M pictures may be first obtained, where a type of the feature information of the first picture is the same as a type of the feature information of the second picture. Then, a change status and/or a relationship between the feature information of the first picture and the feature information of the second picture are/is determined. Finally, the inter-frame information is determined based on the change status and/or the relationship. The inter-frame information is determined based on the change status and/or the relationship between the feature information. In this way, the inter-frame information obtained through calculation can reflect more change information in display content, thereby increasing accuracy of selecting the feature change key point.

In another possible design, the inter-frame information may be a relationship and/or a change status between the current frame and a reference frame. The current frame may be a currently processed picture, and the reference frame may be a picture used as a reference picture to process the current frame. A first picture may be used as the current frame, and a second picture may be used as the reference frame, to calculate the relationship and/or the change status between the current frame and the reference frame. Alternatively, a first picture may be used as the reference frame, and a second picture may be used as the current frame, to calculate the relationship and/or the change status between the current frame and the reference frame. Alternatively, both a first picture and a second picture may be used as reference frames, and a third picture between the first picture and the second picture may be used as the current frame, to calculate the relationship and/or the change status between the current frame and the reference frame.

In another possible design, the feature information includes a height of a target object, and the inter-frame information includes a height change rate. A height of a target object in a first picture of the M pictures and a height of the target object in a second picture of the M pictures may be obtained; a difference between the height of the target object in the first picture and the height of the target object in the second picture, and time duration between the first picture and the second picture in the time sequence are determined; and the height change rate is determined based on the difference and the interval duration.

In another possible design, the feature information includes a picture grayscale, and the inter-frame information includes a frame difference. A first picture grayscale in a first picture and a second picture grayscale in a second picture may be obtained; a difference matrix between the picture grayscale of the first picture and the picture grayscale of the second picture is determined; and the frame difference is determined based on the difference matrix.

In another possible design, after the N pictures corresponding to feature change key points are selected from the M pictures, a quality metric value of each of the N pictures may be determined based on the feature information of each of the N pictures, to obtain N quality metric values. Target pictures are selected from the N pictures based on the N quality metric values, where the N quality metric values are sequentially sorted in descending order, or may be sequentially sorted in ascending order, the target pictures are K pictures whose quality metric values rank top in quality metric values of the N pictures, and K is a positive integer less than or equal to N. Selection is further performed in the N pictures corresponding to the feature change key points, so that quality and accuracy of the selected pictures are ensured.

It should be noted that in this possible design, the feature information in this case may further include related information used for quality metric, for example, an aesthetic evaluation value, definition, contrast, a brightness value, a posture score, an expression score, and an eye closure degree, and the information may have been obtained when the M pictures are selected, or may be obtained after the N pictures are selected. This is not limited in this application.

In another possible design, one of an aesthetic evaluation value, definition, contrast, a brightness value, a posture score, an expression score, and an eye closure degree may be used as the quality metric value; or a weighted average value of at least two of an aesthetic evaluation value, definition, contrast, a brightness value, a posture score, an expression score, and an eye closure degree is determined, and the weighted average value is used as the quality metric value. The quality metric value is calculated in a plurality of reference dimensions, to ensure quality of the selected pictures.

In another possible design, pictures whose quality metric values are greater than a third preset threshold are selected from the N pictures as target pictures, to ensure quality of the selected pictures.

In another possible design, a time point that is of the current frame and that corresponds to at least one of an extreme point, a mean point, an average point, an inflection point, and a clustering center of the inter-frame information may be used as the feature change key point. Because the extreme point, the mean point, the average point, the inflection point, or the clustering center corresponds to a relatively special and representative time point in a feature change process, a user requirement can be better met, and picture selection accuracy is increased.

In another possible design, before the obtaining feature information of each of M pictures in a time sequence, the method further includes: receiving a shutter instruction, and triggering a shutter according to the shutter instruction; and obtaining pictures captured by a camera within a preset time period as the M pictures, where the preset time period includes a preset time period before and after a time point of triggering the shutter.

In another possible design, the N pictures may be presented in a differentiated manner, for example, in a rendering manner, or in a highlighting manner, or in a manner of a separate album.

According to a second aspect, an embodiment of this application provides a picture selection apparatus. The picture selection apparatus is configured to implement the method and the functions performed by a terminal device in the first aspect, and is implemented by hardware/software. The hardware/software of the picture selection apparatus includes units corresponding to the functions.

According to a third aspect, an embodiment of this application provides a terminal device, including a processor, a memory, and a communications bus, where the communications bus is configured to implement a connection and communication between the processor and the memory, and the processor executes a program stored in the memory to implement the steps in the picture selection method provided in the first aspect.

In a possible design, the terminal device provided in this embodiment of this application may include a corresponding module configured to perform an action of the picture selection apparatus in the foregoing method design, and the module may be software and/or hardware.

According to a fourth aspect, an embodiment of this application provides a computer-readable storage medium. The computer-readable storage medium stores an instruction, and when the instruction is run on a computer, the computer is enabled to perform the method in the foregoing aspects.

According to a fifth aspect, an embodiment of this application provides a computer program product including an instruction. When the computer program product is run on a computer, the computer is enabled to perform the method in the foregoing aspects.

BRIEF DESCRIPTION OF DRAWINGS

To describe the technical solutions in the embodiments of this application more clearly, the following describes the accompanying drawings required for the embodiments of this application or the background.

DESCRIPTION OF EMBODIMENTS

The following describes the embodiments of this application with reference to the accompanying drawings in the embodiments of this application.

Figure 1:
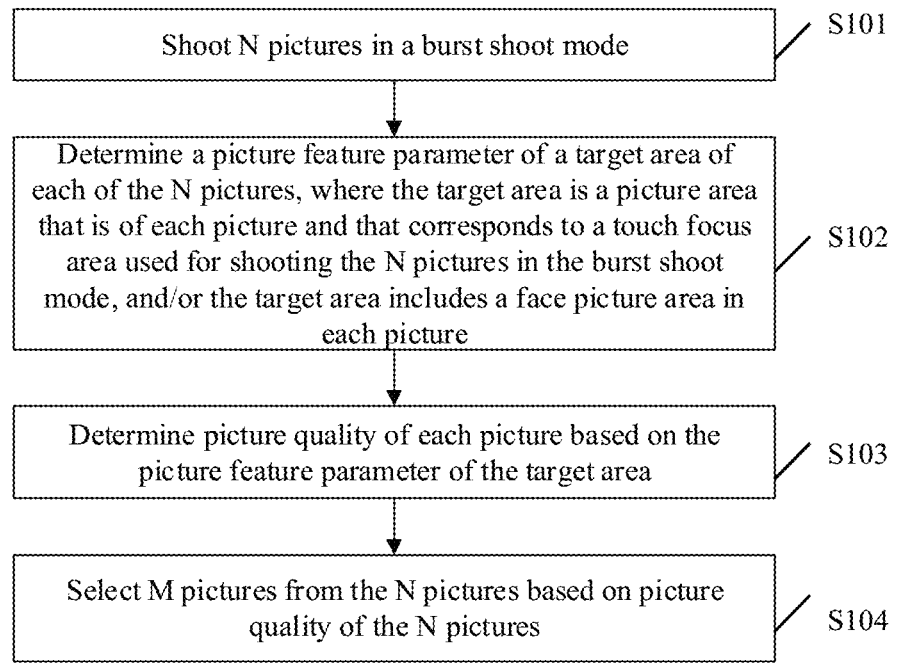
FIG. 1 is a schematic flowchart of a picture selection method.
Figure 2:
FIG. 2 is a schematic diagram of selecting pictures shot in a burst shoot mode.

FIG. 1 is a schematic flowchart of a picture selection method, and the figure shows a process of selecting, by using picture quality of each picture, an optimal picture from pictures obtained through burst shoot. The process includes: S101: Shoot N pictures in a burst shoot mode. S102: Determine a picture feature parameter of a target area of each of the N pictures, where the target area is a picture area that is of each picture and that corresponds to a touch focus area used for shooting the N pictures in the burst shoot mode, and/or the target area includes a face picture area in each picture. S103: Determine picture quality of each picture based on the picture feature parameter of the target area. S104: Select M pictures from the N pictures based on picture quality of the N pictures. FIG. 2 is a schematic diagram of selecting pictures shot in a burst shoot mode. An optimal picture may be selected, according to the foregoing method, from six pictures shot in the burst shoot mode.

Figure 3:
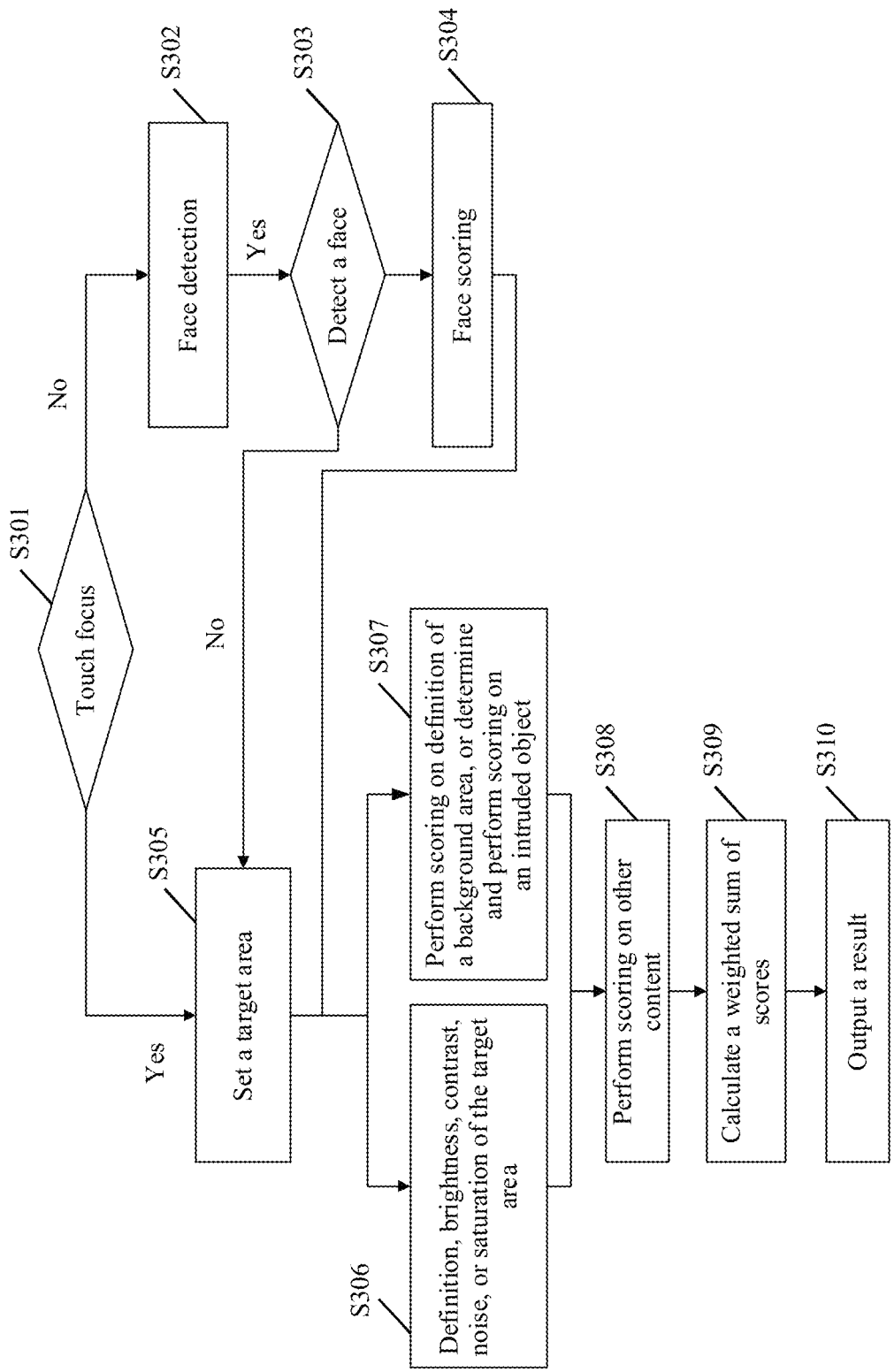
FIG. 3 is a schematic flowchart of a picture quality determining method.

For the foregoing specific method for determining the picture quality, refer to FIG. 3. FIG. 3 is a schematic flowchart of a picture quality determining method. Picture quality may be obtained by processing each of N pictures according to the following steps. It can be learned from S301 to S310 that the following steps are mainly included: determining a target area of a picture; separately performing scoring based on definition, brightness, contrast, noise, saturation, and the like of the target area, performing scoring on definition of a background area, performing scoring on the current picture, for example, an overall aesthetic feeling of the picture; and calculating a weighted sum of scores based on a preset weight, to obtain a total score of the picture.

However, in an actual motion scene, a result of motion capture is not necessarily related to a picture indicator such as definition. For example, the picture definition is related to the following several factors: a. a shooting parameter such as a shutter speed of a camera; b. a camera shake, related to stability and a used equipment of a photographer; and c. a motion speed of an object. In the motion scene, a picture with a beautiful action, a comfortable composition, and an innovative conception is finally selected, and the foregoing factors are not related to the definition of the picture. Similarly, indicators such as brightness, saturation, and noise are not applicable to the motion scene. In addition, a group of actions includes a plurality of wonderful action moments. In this case, it is difficult for a terminal device to determine a moment that a user desires to obtain and that is included in the entire group of actions. However, if the indicators such as the definition and the brightness are used to measure the picture quality, a difference between adjacent frames is very small, and consequently all high-score pictures easily focus near an action moment, and another action moment is missed. The foregoing factors may result in a low action discrimination degree and low picture selection accuracy.

Figure 4:
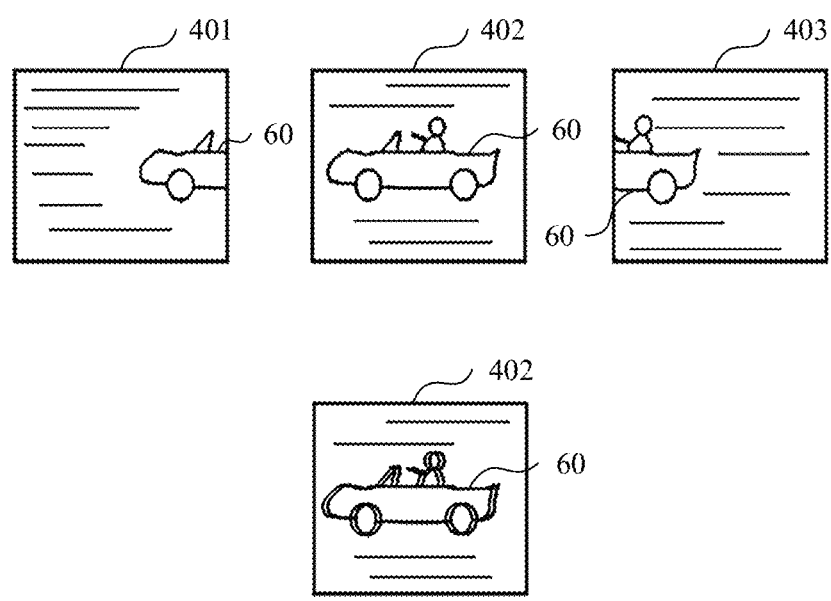
FIG. 4 is a schematic diagram of another picture selection method.

FIG. 4 is a schematic diagram of another picture selection method. This method is to use a position of a target object to determine picture quality. First, a position of a target vehicle in a picture is obtained through calculation by using a target detection algorithm. When the target vehicle is in the middle of the picture, it is considered that this moment is a best shooting moment, and an operation of triggering a shutter, storing, or recommending the picture is performed. It can be learned from FIG. 4 that only a picture 402 is a picture in which the target vehicle is in the middle, and therefore the picture 402 is captured and stored. However, the technical solution is applicable to only a scene in which the target object goes through a lens such as a fixed camera, a vehicle or a person moves in the lens from the right side and moves out the lens from the left side. This manner is limited by a scene. In an actual motion scene, selecting a picture in this manner has low accuracy.

In conclusion, in the actual motion scene, the following problems exist when a picture is selected in the foregoing manner. First, accuracy is low. When features such as definition, contrast, and noise are used to evaluate the picture, a motion status cannot be determined because these features are not directly related to a motion process. Second, an action differentiation degree is low. Picture quality is measured by using indicators such as definition and brightness. A difference between adjacent frames is very small, and consequently all high-quality pictures easily focus near an action moment. In this case, a determining result of an action is affected. Third, a scene is limited. The method for evaluating picture quality by using a position of a target object is applicable to only a scene in which a target goes through the lens in a translation manner, and a position of the lens needs to be fixed. In this case, a use range is very limited. To resolve the foregoing technical problems, the embodiments of this application provide the following solutions.

Figure 5:
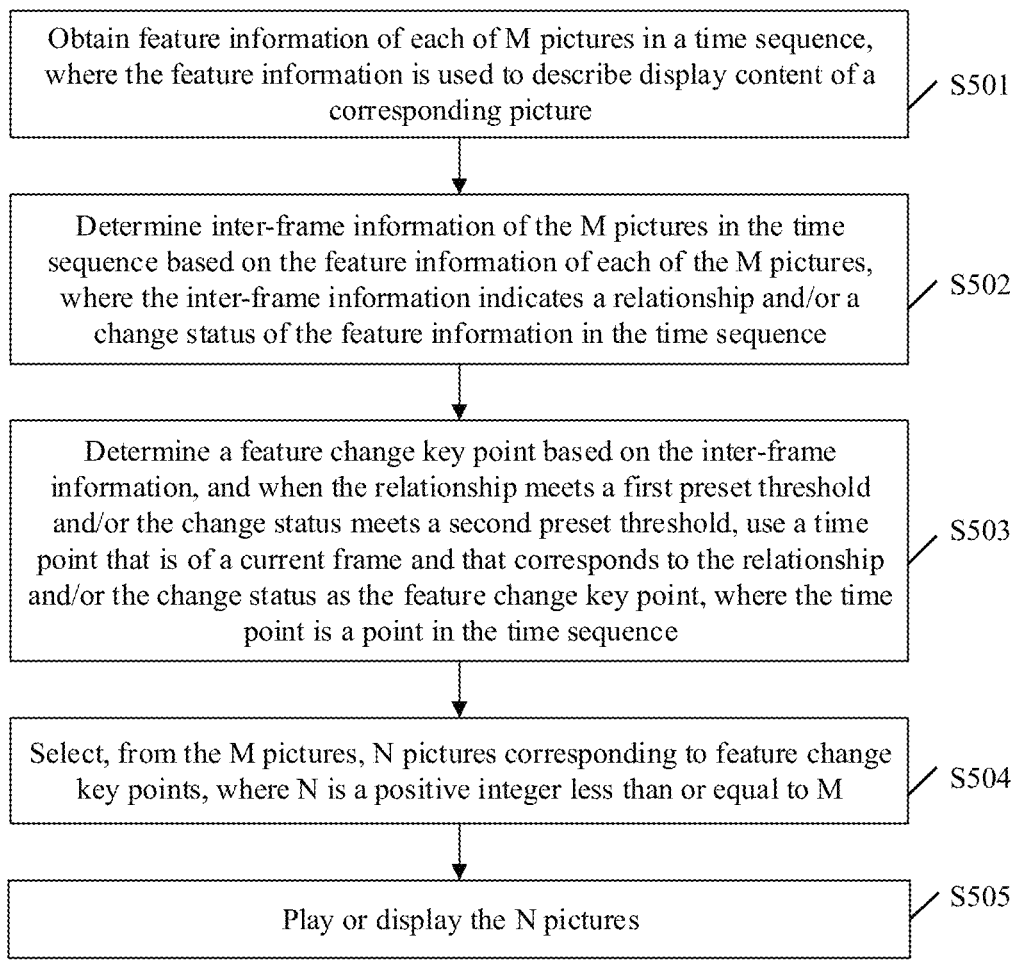
FIG. 5 is a schematic flowchart of a picture selection method according to an embodiment of this application.

FIG. 5 is a schematic flowchart of a picture selection method according to an embodiment of this application. As shown in the figure, the following steps in this embodiment of this application are included.

S501: Obtain feature information of each of M pictures in a time sequence, where M is a positive integer.

In specific implementation, the M pictures in the time sequence may be first obtained by using a camera or from a video. For example, the M pictures may be obtained by long pressing a shutter in a burst shoot mode of the camera. Alternatively, the M pictures may be obtained by continually clicking a shutter. Alternatively, whether a motion scene is met may be determined by using a sensing technology. For example, whether a current target object is in a motion state is determined. When a determining result is yes, burst shoot or a plurality of times of shooting is triggered to obtain the M pictures. Alternatively, a video may be recorded by using a video recording function, and the M pictures are obtained from the video. Then, the feature information of each of the M pictures is obtained.

In a possible implementation, the M pictures may be alternatively obtained in the following manner:

before the feature information of each of the M pictures in the time sequence is obtained, receiving, by a mobile terminal, a shutter instruction, and triggering the shutter according to the shutter instruction.

The mobile terminal obtains a plurality of pictures captured by using a camera within a preset time period and uses the plurality of pictures as the M pictures, where the preset time period includes a preset time period before and after a time point of triggering the shutter. Specifically, in this application, the M pictures may be obtained in a plurality of manners. The M pictures may be obtained by the mobile terminal in a burst shoot mode, may be obtained in another manner mentioned above such as long pressing the shutter, or may be automatically obtained before and after the shutter is pressed.

In a possible implementation, before the shutter instruction is received, the mobile terminal receives a call instruction of a photographing application program, and calls the photographing application program according to the call instruction of the photographing application program, where the photographing application program is used to shoot a picture by using the camera.

It should be noted that a start time point of the preset time period may be calculated when the photographing application program is called, or may be one preset time point, for example, three seconds before the shutter is pressed. This is not limited in this application.

Similarly, an end time point of the preset time period may be a time point at which the photographing application program is disabled or a time point at which calling of the photographing application program is stopped, or may be another preset time point, for example, three seconds after the shutter is pressed. This is not limited in this application, either.

It should be noted that the M pictures obtained in this manner increase a picture selection range, so that a picture finally presented to a user may better meet a requirement of the user.

For example, in a scenario, when a user using the mobile terminal shoots a picture, a relatively proper shooting angle or a relatively proper shooting moment is selected as a focus photographed object of the user. However, an objective reason is that, for example, a hand of a photographer shakes when the shutter is triggered, or a subjective reason is that, for example, a photographer considers that a photographed object at a moment t is better, but a picture shot at a moment at which the shutter is triggered may not meet aesthetic of a photographed person due to a difference between aesthetic of the photographer and the aesthetic of the photographed person. In this scenario, the M pictures within the preset time period before and after the shutter is triggered have more possibilities, and a picture subsequently selected based on this picture set is closer to a picture actually desired by the user.

For example, in another scenario, usually, a posed picture is not as good-looking as a captured picture, and pictures of many people are usually not as good-looking as their usual selves. A main reason may be that a person is unconscious tenseness or uneasiness when facing a lens. Consequently, the posed picture often appears rigid and unnatural. In this scenario, the M pictures within the preset time period before and after the shutter is triggered include more postures and expressions of a person in a relatively natural state. The M pictures are used as a basis for subsequent selection of an optimal picture, so that the optimal picture is closer to performance of the person in a real state, and more easily meets a user requirement.

The feature information is used to describe display content of a corresponding picture, and may indicate that all pictures have respective different display content. The display content may include motion states of a target object in a picture, for example, a position of the target object, a jump height of the target object, and a motion action of the target object (such as squat to jump up, fast rise, hanging in the air, fast fall, or falling to the ground). Alternatively, the display content may include a picture grayscale, intersection over union, and the like. Alternatively, the display content may include quality metric values, for example, an aesthetic evaluation value, definition, contrast, a brightness value, a posture score, an expression score, and an eye closure degree. The quality metric value may be obtained by using a computer visual method, or may be obtained by using a neural network model. Details about how to obtain the quality metric value are not described in this embodiment of this application.

S502: Determine inter-frame information of the M pictures in the time sequence based on the feature information of each of the M pictures, where the inter-frame information indicates a relationship and/or a change status of the feature information in the time sequence.

In specific implementation, the feature information includes at least one of a height of a target object and a picture grayscale. The picture grayscale herein may be specific to the target object, or may be specific to the entire picture. This is not limited in this application.

In a possible implementation, feature information of a first picture of the M pictures and feature information of a second picture of the M pictures may be first obtained, where a type of the feature information of the first picture is the same as a type of the feature information of the second picture. Then, a change status and/or a relationship between the feature information of the first picture and the feature information of the second picture are/is determined. Finally, the inter-frame information is determined based on the change status and/or the relationship. The inter-frame information may be a height change rate, a frame difference, an intersection over union change rate, or the like. The height change rate indicates a jump-up speed of the target object, the frame difference indicates an average value of differences between grayscales of a plurality of pictures, and the intersection over union change rate indicates a speed at which the target object moves in a lens. Alternatively, the inter-frame information may be a feature change status of a plurality of clustering centers obtained by classifying the M pictures in a time sequence.

The inter-frame information may be a relationship and/or a change status between a current frame and a reference frame. It should be noted that in this application, the current frame may be a currently processed picture, and the reference frame may be a picture used as a reference picture to process the current frame. Details are not described below. The first picture may be used as the current frame, and the second picture may be used as the reference frame, to calculate the relationship and/or the change status between the current frame and the reference frame. Alternatively, the first picture may be used as the reference frame, and the second picture may be used as the current frame, to calculate the relationship and/or the change status between the current frame and the reference frame. Alternatively, both the first picture and the second picture may be used as reference frames, and a third picture between the first picture and the second picture may be used as the current frame, to calculate the relationship and/or the change status between the current frame and the reference frame.

It should be noted that one piece of feature information (for example, a height of a target object) in the first picture may be selected, and one piece of feature information (for example, a height of a target object) in the second picture may be selected, to calculate inter-frame information between the first picture and the second picture. Alternatively, a plurality of pieces of feature information (for example, a height of a target object and a picture grayscale) in the first picture may be selected, a plurality of pieces of feature information (for example, a height of a target object and a picture grayscale) in the second picture may be selected, and weighted summation is separately performed on the plurality of pieces of feature information in the first picture and the plurality of pieces of feature information in the second picture, to calculate inter-frame information between the first picture and the second picture.

For example, the M pictures may be separately input into a target detection neural network model, a position box (a black box in FIG. 6) of a target object in each picture is obtained, a quantity of pixels existing from a center point of the position box to a bottom of the picture is calculated, and the quantity of pixels is used as a height of the target object in each picture. The height of the target object in the first picture and the height of the target object in the second picture may be separately obtained according to the foregoing method. Then, a difference between the height of the target object in the first picture and the height of the target object in the second picture, and interval duration between the first picture and the second picture in the time sequence are determined. The difference is divided by the interval duration to calculate a height change rate of the target object. The first picture and the second picture may be consecutive in the time sequence, and the first picture is used as a current frame and the second picture is used as a reference frame, to calculate a height change rate of a target object in the target object in the first picture. Alternatively, the first picture and the second picture may be separated by the third picture in the time sequence, and the first picture and the second picture are used as reference frames and the third picture is used as a current frame, to calculate a height change rate of a target object in the third picture. For example, the height change rate is $V_t=|h_{t+1}-h_{t-1}|/\Delta t$, where $h_{t+1}$ represents the height of the target object in the second picture, $h_{t-t}$ represents the height of the target object in the first picture, $\Delta t$ represents the interval duration between the first picture and the second picture in the time sequence, and $V_t$ represents the height change rate of the third picture between the first picture and the second picture.

Figure 6:
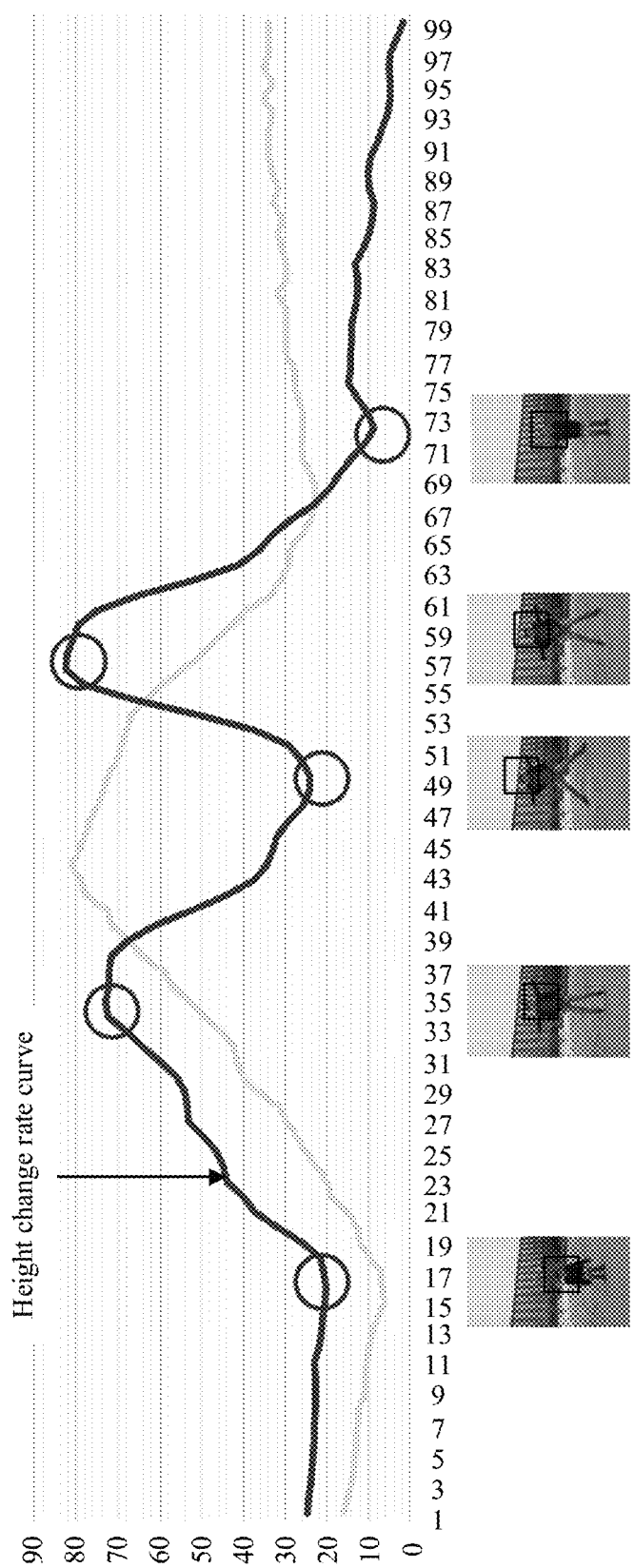
FIG. 6 is a schematic diagram of a height change rate curve according to an embodiment of this application.

As shown in FIG. 6, there are M pictures in a time sequence (as an example, only five pictures are shown in FIG. 6). After a height change rate of a target object in each of the M pictures is obtained through calculation, a height change rate curve shown in FIG. 6 can be drawn. A vertical coordinate of a circle center indicates a height change rate of a target person in each picture, and a horizontal coordinate of the circle center indicates a time point, where each time point corresponds to a picture of the M pictures.

For another example, a picture grayscale of a first picture of the M pictures and a picture grayscale of a second picture of the M pictures may be first obtained. Then, a subtraction is performed between the picture grayscale of the first picture and the picture grayscale of the second picture, to determine a difference matrix between the picture grayscale of the first picture and the picture grayscale of the second picture. Finally, a variance and an average value of the difference matrix are calculated, and the variance or the average value is used as a frame difference between the first picture and the second picture. The first picture and the second picture may be consecutive in the time sequence, and the second picture is used as a reference frame and the first picture is used as a current frame, to calculate a frame difference between the first picture and the second picture. Alternatively, the first picture and the second picture may be separated by a third picture in the time sequence, and the first picture and the second picture are used as reference frames and the third picture is used as a current frame, to calculate a frame difference between the third picture and the first picture.

Figure 7:
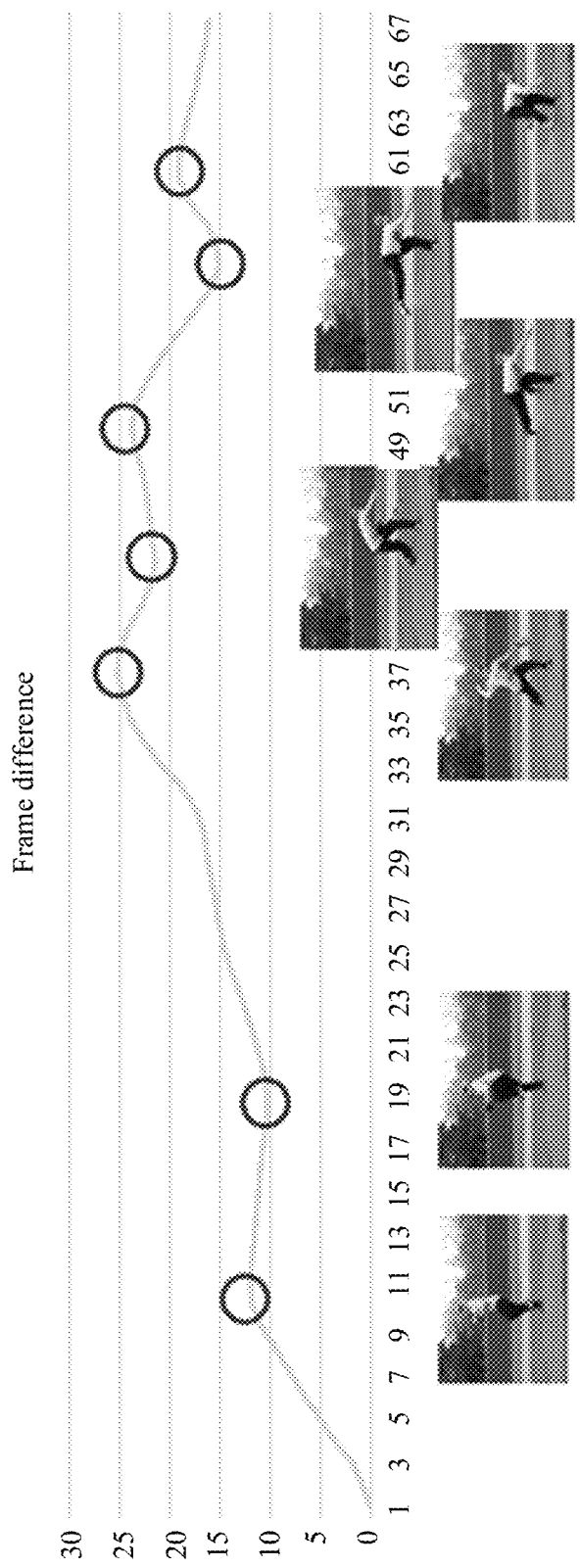
FIG. 7 is a schematic diagram of a frame difference curve according to an embodiment of this application.

As shown in FIG. 7, there are M pictures in a time sequence (only seven pictures are shown in FIG. 7). After a frame difference corresponding to each of the M pictures is obtained through calculation, a frame difference curve shown in FIG. 7 can be drawn. A vertical coordinate of a circle center indicates the frame difference corresponding to each of the M pictures, and a horizontal coordinate of the circle center indicates a time point, where each time point corresponds to a picture of the M pictures.

S503: Determine a feature change key point based on the inter-frame information, and when the relationship meets a first preset threshold and/or the change status meets a second preset threshold, use a time point that is of a current frame and that corresponds to the relationship and/or the change status as the feature change key point, where the time point is a point in the time sequence.

In specific implementation, a time point that is of the current frame and that corresponds to at least one of an extreme point, a mean point, an average point, an inflection point, and a clustering center of the inter-frame information may be used as the feature change key point. The extreme point, the mean point, the average point, the inflection point, or the clustering center corresponds to a relatively special and representative time point in a feature change process.

For example, as shown in FIG. 6, it can be learned from the height change rate curve shown in FIG. 6 that there are five extreme points (which are marked by circles) of height change rates, including two maximum value points and three minimum value points, and the five extreme points respectively correspond to time points of actions in a jump process, for example, squat to jump up, fast rise, hanging in the air, fast fall, and falling to the ground. The maximum value point corresponds to a time point at which a rising speed is the fastest or a time point at which a falling speed is the fastest, and the minimum value point corresponds to a time point of squat to jump up or jump to a highest point. As shown in FIG. 7, it can be learned from the frame difference curve shown in FIG. 7 that there are seven extreme points (which are marked by circles) of frame differences, and the extreme point corresponds to a time point of action such as ball holding, leg lifting, lunging, or body rotation. The actions such as the ball holding, the leg lifting, the lunging, and the body rotation are all key action points that a user wants to capture. Actions at other time points are being changed or actions are not formed, and are unimportant for the user. For another example, all actions in the time sequence can be clustered in a time sequence, and are classified into a plurality of action categories, for example, the ball holding, the leg lifting, the lunging, and the body rotation. Each action category includes a plurality of similar actions, when a time point corresponding to a clustering center of inter-frame information is used as a feature change key point, the clustering center may represent a most typical action in each action category.

S504: Select, from the M pictures, N pictures corresponding to feature change key points, where N is a positive integer less than or equal to M. The following two manners are included.

In an implementation, the N pictures that directly one-to-one correspond to the N feature change key points may be selected from the M pictures.

For example, as shown in FIG. 6, for five circles are marked on the height change rate curve, a vertical coordinate of a center of each circle indicates an extreme point of a height change rate, and a horizontal coordinate of the center of each circle corresponds to a time point in the time sequence. To be specific, five circle centers correspond to five time points, and the five time points are all feature change key points. Five pictures that directly one-to-one correspond to the five time points are selected, and the five pictures may respectively represent pictures corresponding to key actions of a target person in different phases: squat to jump up, fast rise, hanging in the air, fast fall, and falling to the ground. The extreme point of the height change rate is selected, so that an action of the target person in the picture is divided into a plurality of phases, and pictures in different phases can be further selected, thereby ensuring a differentiation degree of the selected pictures.

In another implementation, a picture directly corresponding to a first feature change key point and pictures corresponding to time points before and after a preset range of the first feature change key point may be obtained, to constitute a key picture set of the first feature change key point, a quality metric value of each picture in the key picture set is determined, and a picture corresponding to a maximum quality metric value is selected as a picture that one-to-one corresponds to the first feature change key point, where the first feature change key point is any feature change key point of the N feature change key points. It can be learned that the one-to-one correspondence herein differs from the foregoing direct one-to-one correspondence in that the foregoing direct one-to-one correspondence means that the pictures corresponding to the five feature change key points in FIG. 6 are directly selected as the N pictures, and the one-to-one correspondence herein means that a picture corresponding to each feature change key point is also selected, but a plurality of pictures before and after a specific range of the feature change key point are selected, instead of directly and simply selecting a picture directly corresponding to the feature change key point, to constitute a key picture set, and then a picture with best quality is obtained from the key picture set according to a corresponding rule and is used as the picture corresponding to the feature change key point. In this way, quality of the selected N pictures is improved from a front end.

Figure 8:
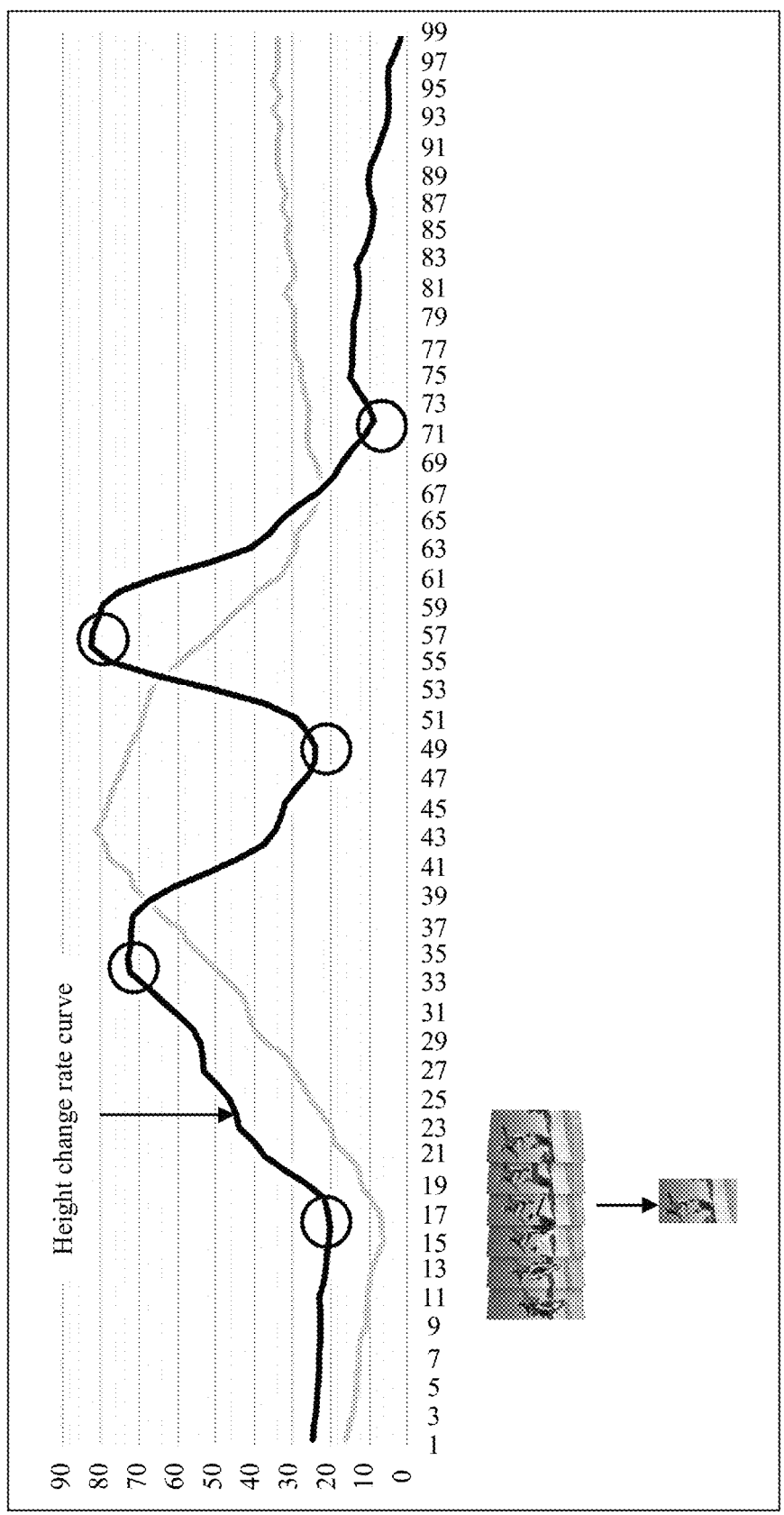
FIG. 8 is a schematic diagram of picture selection according to an embodiment of this application.

For example, as shown in FIG. 8, for five circles are marked on a height change rate curve, a vertical coordinate of a center of each circle indicates an extreme point of a height change rate, and a horizontal coordinate of the center of each circle corresponds to a time point in a time sequence. To be specific, five circle centers correspond to five time points, and the five time points are all feature change key points. A first time point of the five time points corresponds to a key picture set, and the key picture set includes a picture at the first time point, and further includes five other pictures before and after the first time point (five herein is merely an example, and this is not limited in this application). A quality metric value of each of six pictures is obtained, and the quality metric value may be one or more of an aesthetic evaluation value, definition, contrast, a brightness value, a posture score, an expression score, and an eye closure degree. Then, a picture with a maximum quality metric value is selected from the six pictures as a picture corresponding to a first feature change key point. The extreme point of the height change rate is selected, so that an action of a target person in a picture is divided into a plurality of phases, and then a picture with a maximum quality metric value is selected from a plurality of pictures in each phase. This not only ensures a differentiation degree of the selected pictures, but also improves quality of the selected pictures.

Optionally, after the N pictures are selected from the M pictures, a quality metric value of each of the N pictures may be determined based on feature information of each of the N pictures, to obtain N quality metric values, where the N quality metric values are sorted in descending order, or may be sorted in ascending order, target pictures are selected from the N pictures based on the N quality metric values, the target pictures are K pictures whose quality metric values rank top in quality metric values of the N pictures, and K is a positive integer less than or equal to N. Selection is further performed in the N pictures corresponding to the feature change key points based on the quality metric values, so that quality and accuracy of the selected pictures are ensured.

It should be noted that the M pictures obtained in this embodiment of this application may be buffered on the mobile terminal. After the N pictures are selected from the M pictures, or after the K pictures are selected from the N pictures, other unselected pictures may be automatically or manually deleted to release a buffer, or may be stored in the cloud or in another storage unit. This is not limited in this application.

Further, information such as the aesthetic evaluation value, the definition, the contrast, the brightness value, the posture score, the expression score, and the eye closure degree may be obtained from the feature information. In this case, the feature information further includes at least one of the aesthetic evaluation value, the definition, the contrast, the brightness value, the posture score, the expression score, and the eye closure degree, or may be related information, such as the aesthetic evaluation value, the definition, the contrast, the brightness value, the posture score, the expression score, and the eye closure degree, that is obtained for the N pictures after the N pictures are determined. One of the aesthetic evaluation value, the definition, the contrast, the brightness value, the posture score, the expression score, and the eye closure degree is used as the quality metric value. Alternatively, a weighted average value of at least two of the aesthetic evaluation value, the definition, the contrast, the brightness value, the posture score, the expression score, and the eye closure degree is determined, and the weighted average value is used as the quality metric value. In addition to the foregoing references, the quality metric value may be calculated by using another reference. The aesthetic evaluation value, the definition, the contrast, the brightness value, the posture score, the expression score, or the eye closure degree may be obtained by using a computer visual method, or may be obtained by using a neural network model. Finally, pictures whose quality metric values are greater than a third preset threshold are selected from the N pictures as the target pictures.

For example, as shown in FIG. 7, after seven pictures are selected based on the extreme points of the frame differences, a quality metric value of each of the seven pictures, for example, a weighted value of human body definition, an action stretching degree, and an aesthetic evaluation value, may be obtained. The human body definition is sharpness of a person in a human body area. The action stretching degree may be obtained through calculation based on a distance between human bone points, and a larger distance between bone points indicates a more stretched action. The aesthetic evaluation value is a value used to measure aesthetics of a picture in terms of composition, color, a posture, or the like. Finally, further selection is performed in descending order of the quality metric values, and four pictures are selected from the seven pictures for storage.

S505: Play or display the N pictures.

In specific implementation, the N pictures may be presented in a differentiated manner, for example, in a rendering manner, or in a highlighting manner, or in a manner of a separate album. The rendering manner may be used to represent a visualization method for presenting the N pictures in a special visual effect. In a process of playing or displaying the N pictures, display content of the N pictures is divided into key actions in a plurality of different phases for display. For example, as shown in FIG. 6, after the five pictures in FIG. 6 are finally selected, the five pictures may respectively represent the key actions of the target person in the different phases: squat to jump up, fast rise, hanging in the air, fast fall, and falling to the ground.

In this embodiment of this application, the feature change key point corresponds to a moment at which a speed or a rhythm changes in a motion process, for example, a time point at which a motion speed is the fastest, a time point at which a motion speed is the slowest, or a time point at which a previous action is changed to a next action, and a picture is selected by using the feature change key point, so that a picture of a wonderful moment can be captured, thereby increasing picture selection accuracy. In addition, the feature change key point is selected, so that an action of a target person in the picture is divided into a plurality of phases, and pictures in different phases can be further selected, thereby ensuring a differentiation degree of the selected pictures. Finally, selection is further performed based on the quality metric values, so that quality of the selected pictures is ensured.

Figure 9:
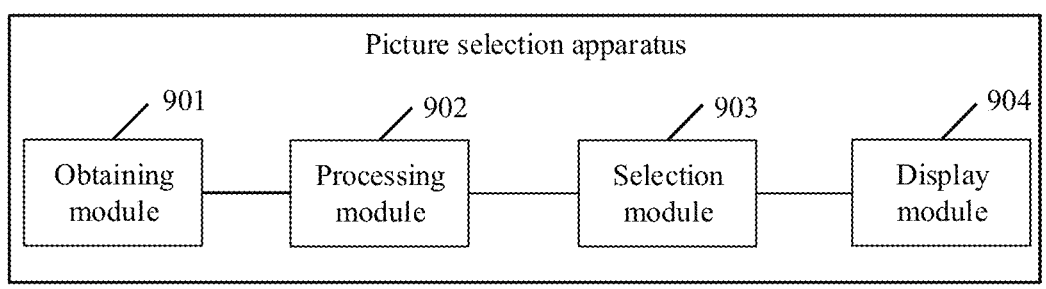
FIG. 9 is a schematic structural diagram of a picture selection apparatus according to an embodiment of this application.

FIG. 9 is a schematic structural diagram of a picture selection apparatus according to an embodiment of this application. As shown in the figure, the apparatus in this embodiment of this application includes an obtaining module 901, a processing module 902, a selection module 903, and a display module 904.

The obtaining module 901 is configured to obtain feature information of each of M pictures in a time sequence, where the feature information is used to describe display content of a corresponding picture, and M is a positive integer.

The processing module 902 is configured to determine inter-frame information of the M pictures in the time sequence based on the feature information of each of the M pictures, where the inter-frame information indicates a relationship and/or a change status of the feature information in the time sequence.

The processing module 902 is further configured to: determine a feature change key point based on the inter-frame information, and when the relationship meets a first preset threshold and/or the change status meets a second preset threshold, use a time point that is of a current frame and that corresponds to the relationship and/or the change status as the feature change key point, where the time point is a point in the time sequence.

The selection module 903 is configured to select, from the M pictures, N pictures corresponding to feature change key points, where N is a positive integer less than or equal to M.

The display module 904 is configured to play or display the N pictures.

Optionally, the selection module 903 is further configured to select, from the M pictures, the N pictures that directly one-to-one correspond to the N feature change key points.

Alternatively, the selection module 903 is further configured to: obtain a picture directly corresponding to a first feature change key point and pictures corresponding to time points before and after a preset range of the first feature change key point, to constitute a key picture set of the first feature change key point, determine a quality metric value of each picture in the key picture set, and select a picture corresponding to a maximum quality metric value as the picture that one-to-one corresponds to the first feature change key point, where the first feature change key point is any feature change key point of the N feature change key points.

The feature information includes a height of a target object, and the inter-frame information includes a height change rate.

Optionally, the obtaining module 901 is further configured to obtain a height of a target object in a first picture of the M pictures and a height of the target object in a second picture of the M pictures.

The processing module 902 is further configured to: determine a difference between the height of the target object in the first picture and the height of the target object in the second picture, and interval duration between the first picture and the second picture in the time sequence; and determine the height change rate based on the difference and the interval duration.

The feature information includes a picture grayscale, and the inter-frame information includes a frame difference.

The obtaining module 901 is further configured to obtain a picture grayscale of a first picture of the M pictures and a picture grayscale of a second picture of the M pictures.

The processing module 902 is further configured to: determine a difference matrix between the picture grayscale of the first picture and the picture grayscale of the second picture; and determine the frame difference based on the difference matrix.

Optionally, the selection module 903 is further configured to: determine a quality metric value of each of the N pictures based on the feature information of each of the N pictures, to obtain N quality metric values; and select target pictures from the N pictures based on the N quality metric values, where the target pictures are K pictures whose quality metric values rank top in quality metric values of the N pictures, and K is a positive integer less than or equal to N.

Optionally, the selection module 903 is further configured to select, from the N pictures, pictures whose quality metric values are greater than a third preset threshold as the target pictures.

The feature information includes at least one of an aesthetic evaluation value, definition, contrast, a brightness value, a posture score, an expression score, and an eye closure degree.

The processing module 902 is further configured to: use one of the aesthetic evaluation value, the definition, the contrast, the brightness value, the posture score, the expression score, and the eye closure degree as the quality metric value.

Alternatively, the processing module 902 is further configured to: determine a weighted average value of at least two of the aesthetic evaluation value, the definition, the contrast, the brightness value, the posture score, the expression score, and the eye closure degree, and use the weighted average value as the quality metric value.

It should be noted that, for implementation of each module, refer to the corresponding description in the method embodiment shown in FIG. 5, to perform the method and the function performed by the terminal device in the foregoing embodiment.

Figure 10:
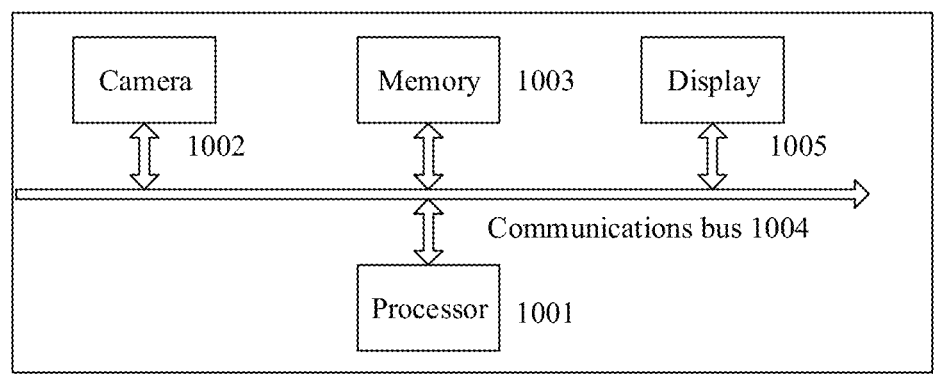
FIG. 10 is a schematic structural diagram of a terminal device according to an embodiment of this application.

FIG. 10 is a schematic structural diagram of a terminal device according to an embodiment of this application. As shown in FIG. 10, the terminal device may include at least one processor 1001, a camera 1002, at least one memory 1003, a communications bus 1004, and a display 1005. Certainly, in some implementations, the processor and the memory may be alternatively integrated.

In this embodiment of this application, the camera 1002 may be configured to shoot a plurality of pictures in any scene. The display 1005 may be configured to display the plurality of pictures shot by using the camera, or display a finally selected picture. The memory 1003 is configured to store the pictures obtained by using the camera and the finally selected picture, and may further store a calculation instruction. The processor 1001 may be configured to execute the calculation instruction located in the memory, for example, to calculate inter-frame information between the plurality of pictures, select a feature change key point, or select a picture by using a feature change key point.

The processor 1001 may implement or execute various example logical blocks, modules, and circuits described with reference to content disclosed in this application. Alternatively, the processor may be a combination of processors implementing a computing function, for example, a combination including one or more microprocessors, or a combination of a digital signal processor and a microprocessor. The communications bus 1004 may be a peripheral component interconnect (PCI) bus, an extended industry standard architecture EISA bus, or the like. The bus may be classified into an address bus, a data bus, a control bus, or the like. For ease of representation, only one thick line is used to represent the bus in FIG. 10, but this does not mean that there is only one bus or only one type of bus. The communications bus 1004 is configured to implement a connection and communication between these components. The memory 1003 may include a volatile memory, for example, a nonvolatile random-access memory (nonvolatile random access memory, NVRAM), a phase-change random-access memory (phase-change RAM, PRAM), or a magnetoresistive random-access memory (magnetoresistive RAM, MRAM). The memory 1003 may alternatively include a nonvolatile memory, for example, at least one magnetic disk storage device, an electrically erasable programmable read-only memory (EEPROM), a flash storage device such as a NOR flash memory or a NAND flash memory, or a semiconductor device such as a solid state disk (SSD). Optionally, the memory 1003 may be alternatively at least one storage apparatus far away from the processor 1001. Optionally, the memory 1003 may further store a set of program code, and optionally, the processor 1001 may further execute the program code stored in the memory 1003.

Feature information of each of M pictures in a time sequence is obtained, where the feature information is used to describe display content of a corresponding picture, and M is a positive integer.

Inter-frame information of the M pictures in the time sequence is determined based on the feature information of each of the M pictures, where the inter-frame information indicates a relationship and/or a change status of the feature information in the time sequence.

A feature change key point is determined based on the inter-frame information, and when the relationship meets a first preset threshold and/or the change status meets a second preset threshold, a time point that is of a current frame and that corresponds to the relationship and/or the change status is used as the feature change key point, where the time point is a point in the time sequence.

N pictures corresponding to feature change key points are selected from the M pictures, where N is a positive integer less than or equal to M.

The N pictures are played or displayed by using the display 1005.

There are N feature change key points, and the N pictures one-to-one correspond to the N feature change key points.

Optionally, the processor 1001 is further configured to perform the following operation:

selecting, from the M pictures, the N pictures that directly one-to-one correspond to the N feature change key points; or obtaining a picture directly corresponding to a first feature change key point and pictures corresponding to time points before and after a preset range of the first feature change key point, to constitute a key picture set of the first feature change key point, determining a quality metric value of each picture in the key picture set, and selecting a picture corresponding to a maximum quality metric value as the picture that one-to-one corresponds to the first feature change key point, where the first feature change key point is any feature change key point of the N feature change key points.

The feature information includes a height of a target object, and the inter-frame information includes a height change rate.

Optionally, the processor 1001 is further configured to perform the following operations:

obtaining a height of a target object in a first picture of the M pictures and a height of the target object in a second picture of the M pictures; and determining a difference between the height of the target object in the first picture and the height of the target object in the second picture, and interval duration between the first picture and the second picture in the time sequence; and determine the height change rate based on the difference and the interval duration.

The feature information includes a picture grayscale, and the inter-frame information includes a frame difference.

Optionally, the processor 1001 is further configured to perform the following operations:

obtaining a picture grayscale of a first picture of the M pictures and a picture grayscale of a second picture of the M pictures;

determining a difference matrix between the picture grayscale of the first picture and the picture grayscale of the second picture; and determining the frame difference based on the difference matrix.

Optionally, the processor 1001 is further configured to perform the following operations:

determining a quality metric value of each of the N pictures based on the feature information of each of the N pictures, to obtain N quality metric values; and selecting target pictures from the N pictures based on the N quality metric values, where the target pictures are K pictures whose quality metric values rank top in quality metric values of the N pictures, and K is a positive integer less than or equal to N.

Optionally, the processor 1001 is further configured to perform the following operation:

selecting, from the N pictures, pictures whose quality metric values are greater than a third preset threshold as the target pictures.

The feature information includes at least one of an aesthetic evaluation value, definition, contrast, a brightness value, a posture score, an expression score, and an eye closure degree.

Optionally, the processor 1001 is further configured to perform the following operation:

using one of the aesthetic evaluation value, the definition, the contrast, the brightness value, the posture score, the expression score, and the eye closure degree as the quality metric value; or determining a weighted average value of at least two of the aesthetic evaluation value, the definition, the contrast, the brightness value, the posture score, the expression score, and the eye closure degree, and using the weighted average value as the quality metric value.

Further, the processor may further cooperate with the memory and the display, to perform the operations of the picture selection apparatus in the foregoing embodiment of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or the functions according to the embodiments of this application are completely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

The objectives, the technical solutions, and beneficial effects of this application are further described in detail in the foregoing specific implementations. Any modification, equivalent replacement, or improvement made without departing from the spirit and principle of this application shall fall within the protection scope of this application.

What is claimed is:

1. A method performed by a computerized user device for selecting pictures from a sequence of pictures of an object in motion, comprising:
   determining, for each picture in the sequence of pictures, a value of a motion feature of the object;
   analyzing the values of the motion feature of the object by calculating inflection points in a curve of the values of the motion feature of the pictures in the sequence;
   identifying, based on the inflection points in the curve, a first subset of pictures from the pictures in the sequence, wherein the first subset of pictures comprises pictures corresponding to the inflection points;
   selecting, based on a second selection criterion, a second subset of pictures from the first subset of pictures; and
   displaying the pictures in the second subset to a user for further selection.

2. A method as in claim 1, wherein the motion feature of the object is a rate of change of a height of the object in the sequence of pictures.

3. A method as in claim 1, wherein the motion feature of the object is a speed of the object.

4. A method as in claim 1, wherein the motion feature of the object is a pace of the object.

5. A method as in claim 1, wherein the motion feature of the object is an intra-frame gray level change.

6. A method as in claim 1, wherein the step of identifying identifies pictures corresponding to the inflection points and pictures within a preset range before and after the inflection points as the first subset of pictures.

7. A method as in claim 1, wherein the step of selecting comprises:
   determining a quality metric value of each of the pictures in the first subset; and
   selecting pictures from the first subset of pictures based on the quality metric values of the first subset of pictures as the second subset of pictures, wherein the second subset of pictures comprises pictures with quality metric values ranked top among the quality metric values of the pictures in the first subset.

8. A computerized user device for selecting pictures from a sequence of pictures of an object in motion, comprising:
   a receiving interface;
   a memory storing executable instructions; and
   a processor configured to execute the executable instructions to:
   determine, for each picture in the sequence of pictures, a value of a motion feature of the object;
   analyze the values of the motion feature of the object by calculating inflection points in a curve of the values of the motion feature of the pictures in the sequence;
   identify, based on the inflection points in the curve, a first subset of pictures from the pictures in the sequence, wherein the first subset of pictures comprises pictures corresponding to the inflection points;
   select, based on a second selection criterion, a second subset of pictures from the first subset of pictures; and
   display the pictures in the second subset to a user for further selection.

9. A device as in claim 8, wherein the motion feature of the object is a rate of change of a height of the object in the sequence of pictures.

10. A device as in claim 8, wherein the motion feature of the object is a speed of the object.

11. A device as in claim 8, wherein the motion feature of the object is a pace of the object.

12. A device as in claim 8, wherein the motion feature of the object is an intra-frame gray level change.

13. A device as in claim 8, wherein the processor is configured to identify the first subset of pictures by:
   identifying pictures corresponding to the inflection points and pictures within a preset range before and after the inflection points as the first subset of pictures.

14. A device as in claim 8, wherein the processor is configured to select the second subset of pictures by performing operations of:
   determining a quality metric value for each picture in the first subset of pictures; and
   selecting pictures from the first subset of pictures based on the quality metric values of the pictures in the first subset as the second subset of pictures, wherein the second subset of pictures comprises pictures with quality metric values ranked top among the quality metric values of the pictures in the first subset.

15. A non-transitory computer-readable storage medium having stored thereon executable instructions that when executed by a processor of a computerized user device cause the computerized user device to perform operations of:
   determining, for each picture in a sequence of pictures of an object in motion, a value of a motion feature of the object;

analyzing the values of the motion feature of the object by calculating inflection points in a curve of the values of the motion feature of the pictures in the sequence;

identifying, based on the inflection points in the curve, a first subset of pictures from the pictures in the sequence, wherein the first subset of pictures comprises pictures corresponding to the inflection points;

selecting, based on a second selection criterion, a second subset of pictures from the first subset of pictures; and displaying the pictures in the second subset to a user for further selection.

* * * * *